(12) United States Patent
Yamazaki et al.

(10) Patent No.: US 7,459,097 B2
(45) Date of Patent: Dec. 2, 2008

(54) METHOD OF FORMING A CONDUCTIVE PATTERN

(75) Inventors: Kotaro Yamazaki, Kawasaki (JP); Takashi Ito, Kawasaki (JP); Junji Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 368 days.

(21) Appl. No.: 11/482,467

(22) Filed: Jul. 7, 2006

(65) Prior Publication Data

US 2007/0221612 A1     Sep. 27, 2007

(30) Foreign Application Priority Data

Mar. 24, 2006     (JP)     ............................ 2006-081818

(51) Int. Cl.
*B44C 1/22* (2006.01)

(52) U.S. Cl. ............................ 216/22; 216/37; 216/67; 360/59; 360/55; 360/57; 360/131; 360/135; 369/13.01; 369/13.02

(58) Field of Classification Search ............... 216/22; 360/55; 369/13.01
See application file for complete search history.

(56) References Cited

U.S. PATENT DOCUMENTS 5,331,495 A * 7/1994 Yoshida et al. ............... 360/126

FOREIGN PATENT DOCUMENTS

JP     07-272216     10/1995

* cited by examiner

*Primary Examiner*—Duy-Vu Deo
*Assistant Examiner*—Maki Angadi
(74) *Attorney, Agent, or Firm*—Greer, Burns & Crain, Ltd.

(57) ABSTRACT

A method of forming a conductive pattern can form a conductive pattern where the aspect ratio of the height to the width is high with favorable electrical connectivity. The method includes a process that forms a first resist layer, which exposes formation positions of a conductive pattern, on a formation surface on which the conductive pattern is to be formed, a process that forms a first stage conductive pattern by carrying out plating at the positions exposed from the first resist layer, a process that forms a first stage protective film which protects the first stage conductive pattern, a process that grinds flat a surface of the first stage protective film and end surfaces of the first stage conductive pattern, a process that forms a second resist layer, which exposes parts of the end surfaces of the first stage conductive pattern more narrowly than the first stage conductive pattern, on the surface of the first stage protective film and the end surfaces of the first stage conductive pattern, and a process that forms a second stage conductive pattern by carrying out plating at the positions on the end surfaces of the first stage conductive pattern that are exposed from the second resist layer.

7 Claims, 3 Drawing Sheets

METHOD OF FORMING A CONDUCTIVE PATTERN

BACKGROUND OF THE INVENTION

1. Field of the Invention

The present invention relates to a method of forming a conductive pattern and in particular a conductive pattern where vertical leads are formed as external connection terminals of a magnetic head.

2. Related Art

On a thin-film magnetic head used in a magnetic disk apparatus, so-called "vertical leads" formed in the shape of columns that extend perpendicular to a thin magnetic film and pass through an alumina protective film provided on an outer surface of the magnetic head are used as terminals for electrically connecting to external devices.

A typical thin-film magnetic head is provided with two read vertical leads and two write vertical leads, making a total of four vertical leads.

However, the miniaturization of thin-film magnetic heads in recent years has made it increasingly necessary to form the vertical leads with narrow widths so that a plurality of vertical leads can be provided in a narrow space.

In particular, when using DFH (Dynamic Flying Height) technology where a heater is incorporated in a magnetic head to control the float height of the magnetic head above a magnetic medium, in addition to the four read and write vertical leads, it is necessary to provide a further two vertical leads to connect the heater. Therefore, out of the limitations for suppressing the size of the magnetic head, it is necessary to make the widths of the vertical leads even smaller.

To ensure that the magnetic head has sufficient mechanical strength, the alumina protective film cannot be made very thin. This means that the heights of the vertical leads cannot be greatly reduced.

That is, in recent years, there has been increasing demand for the vertical leads to be formed with narrower widths but with no reduction in height.

For example, there is demand for vertical leads where the width is around 30 to 40 µm and the height of the vertical leads that is substantially equal to the thickness of the alumina protective film is around 70 to 80 µm.

The vertical leads of a magnetic head are normally formed using photolithography. That is, a photosensitive resist layer is formed on a surface of the magnetic head on which the vertical leads are to be formed and then the photosensitive resist layer is exposed and developed so as to remove the photosensitive resist layer only at the formation positions of the vertical leads. After this, a conductive pattern that serves as the vertical leads is formed by plating, for example, at the parts where the photosensitive resist layer has been removed.

However, during photolithography, it is difficult to expose and develop the photosensitive resist layer in a suitable manner for vertical leads such as those described above where the aspect ratio of the height to the width is high.

A technique for exposing and developing a photosensitive resist layer corresponding to vertical leads where the aspect ratio of the height to the width is high is disclosed in Patent Document 1.

Patent Document 1 discloses a technique for forming the photosensitive resist layer so that vertical leads where the aspect ratio of the height to the width is high can be produced by repeatedly carrying out an exposing/developing process at parts of the photosensitive resist layer that correspond to the vertical leads.

Patent Document 1

Japanese Laid-Open Patent Publication No. H07-272216

However, with the method of forming the vertical leads of a magnetic head disclosed in Patent Document 1, even if it is possible to form a suitable photosensitive resist layer for vertical leads with a high aspect ratio, there is the problem that it will still be difficult to form the vertical leads by plating.

That is, with the technique disclosed in Patent Document 1, even if the photosensitive resist layer can be suitably exposed and developed for the formation of vertical leads with widths of around 30 to 40 µm and heights of around 70 to 80 µm, for example, it is difficult for plating solution to spread inside holes of such shapes, and therefore it is extremely difficult to form a conductive pattern (i.e., vertical leads) with favorable electrical connectivity inside such holes.

SUMMARY OF THE INVENTION

The present invention was conceived in order to solve the problem described above and it is an object of the present invention to provide a method of forming a conductive pattern of a magnetic head that can form a conductive pattern where the aspect ratio of the height to the width is high with favorable electrical connectivity.

To achieve the stated object, a method of forming a conductive pattern of a magnetic head according to the present invention includes: a first resist layer forming process that forms a first resist layer, which exposes formation positions of the conductive pattern, on a formation surface of the conductive pattern; a first stage conductive pattern forming process that forms a first stage conductive pattern by carrying out plating at the positions of the formation surface that are exposed from the first resist layer; a first resist layer removing process that removes the first resist layer; a first stage protective film covering process that forms a first stage protective film, which covers and protects the first stage conductive pattern, on the formation surface; a first stage grinding process that grinds flat a surface of the first stage protective film and end surfaces of the first stage conductive pattern to make the surface and the end surfaces flush; a second resist layer forming process that forms a second resist layer, which exposes parts of the end surfaces of the first stage conductive pattern more narrowly than the first stage conductive pattern, on the surface of the first stage protective film and the end surfaces of the first stage conductive pattern; a second stage conductive pattern forming process that forms a second stage conductive pattern by carrying out plating at the positions on the end surfaces of the first stage conductive pattern that are exposed from the second resist layer; a second resist layer removing process that removes the second resist layer; and a second stage protective film forming process that forms a second stage protective film, which surrounds and protects outer circumferential surfaces of the second stage conductive pattern, on the first stage protective film.

By doing so, the conductive pattern is formed by being divided into a first stage and a second stage in the height direction, and therefore the depths of the holes in the resist layers corresponding to formation positions of the conductive patterns can be kept shallow. Accordingly, when carrying out plating to form the first stage conductive pattern and the second stage conductive pattern, since plating is carried out inside shallow holes, the plating solution can spread out favorably and therefore conductive patterns with favorable electrical connectivity can be formed. In particular, since the surface of the first stage protective film and the end surfaces of the first stage conductive pattern are ground flat during the first stage grinding process, the second resist layer can be formed with a highly precise position and form. In addition, since the second stage conductive pattern is formed narrower than the first stage conductive pattern, even if the second stage conductive pattern is displaced with respect to the first stage conductive pattern, it will still be possible to position the second stage conductive pattern completely on the end surfaces of the first stage conductive pattern and therefore maintain favorable electrical connectivity. Also, since the resist layer is divided into the first and second resist layers that are both formed thinly, it is possible to form the resist patterns easily and with highly precise forms.

In addition, in the second resist layer forming process, the second resist layer may be formed so that exposed areas of end surfaces of the first stage conductive pattern that are exposed from the second resist layer are around 10% smaller than entire areas of the end surfaces.

By doing so, displacements between the first stage conductive pattern and the second stage conductive pattern can be almost definitely absorbed.

The method may further include a process of forming pads on end surfaces of the second stage conductive pattern after the second stage protective film forming process.

The second stage protective film forming process may include: a second protective film covering process that forms the second protective film on the first stage protective film to cover and protect the second stage conductive pattern; and a second stage grinding process that grinds flat a surface of the second stage protective film and end surfaces of the second stage conductive pattern to make the surface and the end surfaces flush, wherein after the second stage protective film forming process, a third stage conductive pattern and a third stage protective film may be formed on the surface of the second stage protective film and the end surfaces of the second stage conductive pattern by carrying out identical processes to the second resist layer forming process, the second stage conductive pattern forming process, the second resist layer removing process, and the second protective film forming process.

By doing so, a conductive pattern with a higher aspect ratio can be favorably formed.

Also, a process that forms a first conductive layer as a base for plating on the formation surface may be carried out before the first resist layer forming process, a process that removes the first conductive layer may be carried out after the first resist layer forming process, the first stage conductive pattern forming process, and the first resist layer removing process, a process that forms a second conductive layer as a base for plating on the surface of the first stage protective film and the end surfaces of the first stage conductive pattern may be carried out after the first stage protective film covering process and the first stage grinding process, a process that removes the second conductive layer may be carried out after the second resist layer forming process, the second stage conductive pattern forming process, and the second resist layer removing process, and the plating that forms the first stage and the second stage conductive patterns may be electrolytic plating that respectively uses the first conductive layer and the second conductive layer as power supplying layers.

By doing so, the first stage conductive pattern and the second stage conductive pattern can be formed by electrolytic plating with the first and second conductive layers at the bottoms of the holes in the resist layers as bases for plating. Accordingly, a conductive pattern with favorable electrical connectivity can be formed.

The first and second resist layer forming processes may respectively form the first and second resist layers by photolithography.

By doing so, since the resist layer is divided into the first and second resist layers that can be formed thinly, compared to the technique disclosed by Patent Document 1, it is possible to form the resist pattern easily and with a highly precise form while still using photolithography.

The first and second protective films may be composed of alumina.

According to the method of forming a conductive pattern according to the present invention, it is possible to form a conductive pattern where the aspect ratio of the height to the width is high with favorable electrical connectivity.

BRIEF DESCRIPTION OF THE DRAWINGS

The aforementioned and other objects and advantages of the present invention will become apparent to those skilled in the art upon reading and understanding the following detailed description with reference to the accompanying drawings.

In the drawings.

DESCRIPTION OF THE PREFERRED EMBODIMENTS

A method of forming vertical leads of a magnetic head will now be described as a preferred embodiment of a method of forming a conductive pattern according to the present invention.

FIGS. 1A to 3G are diagrams useful in explaining a method of forming vertical leads of a magnetic head according to an embodiment of a method of forming a conductive pattern.

Figure 1A:
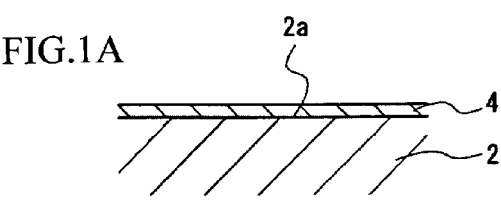
FIGS. 1A to 1F are diagrams useful in explaining a method of forming a conductive pattern according to the present invention.

In the method of forming vertical leads of a magnetic head according to this embodiment, first, as shown in FIG. 1A, a first conductive layer 4 as a base for electrolytic copper plating is formed by sputtering on a lead formation surface 2a, on which vertical leads will be formed as a conductive pattern, of a thin-film magnetic head 2 that has been formed on a wafer.

Figure 1B:
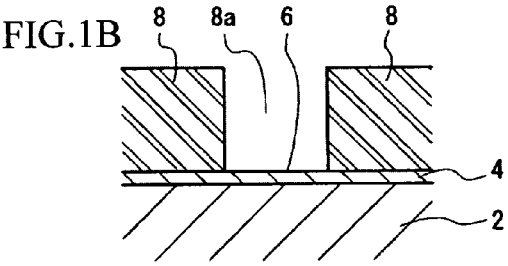

Next, as shown in FIG. 1B, a photosensitive first resist layer 8 is formed on the lead formation surface 2a (i.e., on the first conductive layer 4) by a well-known photolithographic method so that formation positions 6 of the vertical leads are exposed (a first resist layer formation process). Note that in the present embodiment, the first resist layer 8 is formed so that the thickness is around 40 μm, and the width of holes 8a corresponding to the vertical leads are around 40 μm. Note that the openings of the holes 8a are formed so as to be quadrangular in cross section.

Figure 1C:
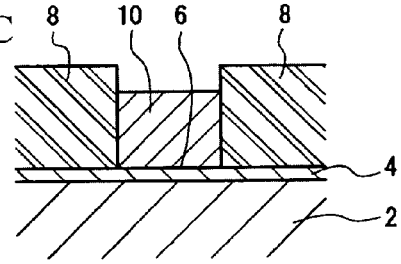

After this, electrolytic copper plating is carried out inside the holes 8a with the first conductive layer 4 as the power supplying layer. By doing so, as shown in FIG. 1C, the holes 8a are filled with copper by the electrolytic copper plating to form first stage vertical leads 10 as a first stage conductive pattern at the formation positions 6 exposed from the first resist layer 8 (a first stage conductive pattern forming process). In the present embodiment, the first stage vertical leads 10 are formed with a height of around 37 µm.

Figure 1D:
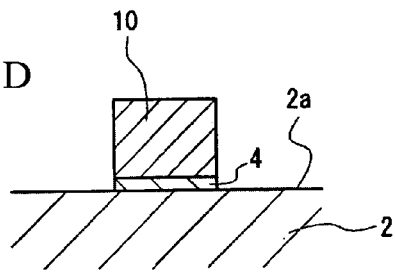

Next, as shown in FIG. 1D, the first resist layer 8 is removed (a first resist layer removing process) and the first conductive layer 4 that becomes exposed by doing so is removed by a well-known method such as ion milling.

Figure 1E:
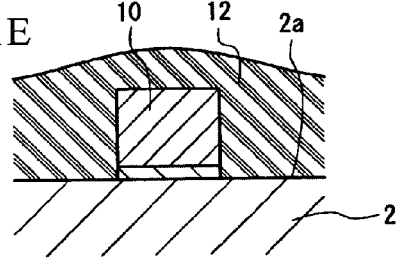

After this, as shown in FIG. 1E, a first stage protective film 12 is formed on the lead formation surface 2a to cover and protect the first stage vertical leads 10 (a first stage protective film covering process). Note that the first stage protective film 12 is composed of alumina.

Figure 1F:
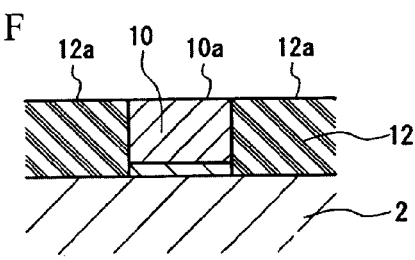

Next, as shown in FIG. 1F, a surface 12a of the first stage protective film 12 and end surfaces 10a of the first stage vertical leads 10 are ground flat so that the surface 12a and the end surfaces 10a become flush (a first stage grinding process).

Figure 2A:
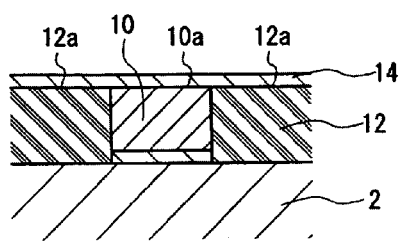
FIGS. 2A to 2G are diagrams useful in explaining a method of forming a conductive pattern according to the present invention.

After this, as shown in FIG. 2A, a second conductive layer 14 used as a base for electrolytic copper plating is formed by sputtering on the surface 12a of the first stage protective film 12 and the end surfaces 10a of the first stage vertical leads 10.

Figure 2B:
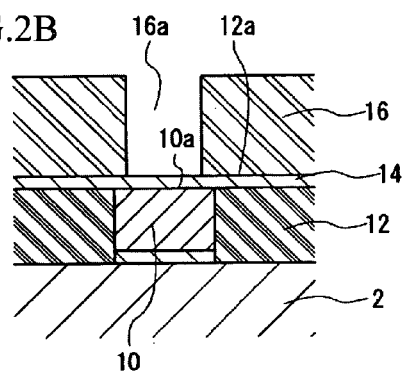

Next, as shown in FIG. 2B, by carrying out photolithography on the surface 12a of the first stage protective film 12 and the end surfaces 10a of the first stage vertical leads 10 (i.e., on the second conductive layer 14), a photosensitive second resist layer 16 is formed so that parts of the end surfaces 10a of the first stage vertical leads 10 are exposed (i.e., the end surfaces 10a become exposed via the second conductive layer 14) (a second resist layer forming process).

Note that in the present embodiment, the second resist layer 16 is formed with a thickness of around 40 µm and so that holes 16a corresponding to the vertical leads are around 37 µm wide. Note that the openings of the holes 16a are formed so as to be quadrangular in cross sections. Accordingly, the exposed areas (37 µm×37 µm) of the end surfaces 10a of the first stage vertical leads 10 that are exposed from the second resist layer 16 are around 10% smaller than the entire areas (40 µm×40 µm) of the end surfaces 10a.

Figure 2C:
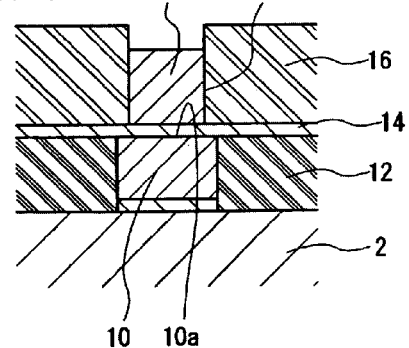

After this, electrolytic copper plating is carried out inside the holes 16a with the second conductive layer 14 as the power supplying layer. By doing so, as shown in FIG. 2C, the holes 16a are filled with copper by the electrolytic copper plating to form second stage vertical leads 18 as a second stage conductive pattern on the end surfaces 10a of the first stage vertical leads 10 (a second stage conductive pattern forming process). In the present embodiment, the second stage vertical leads 18 are formed with a height of around 37 µm.

Figure 2D:
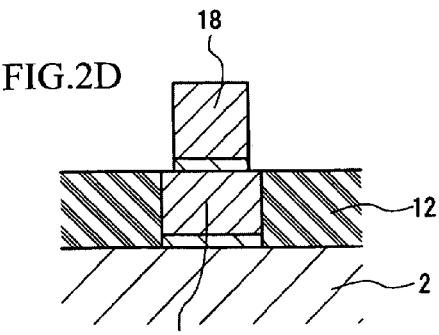

Next, as shown in FIG. 2D, the second resist layer 16 is removed (a second resist layer removing process) and the second conductive layer 14 that becomes exposed by doing so is removed by a well-known method such as ion milling.

Figure 2E:
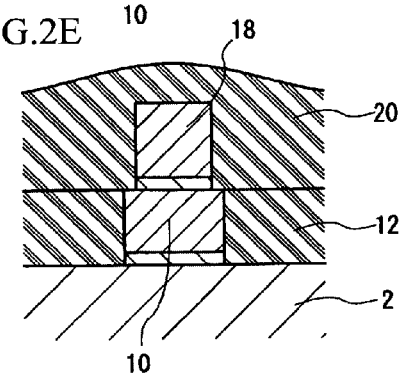

After this, as shown in FIG. 2E, a second stage protective film 20 is formed on the first stage protective film 12 to cover and protect the second stage vertical leads 18 (a second stage protective film covering process). Note that the second stage protective film 20 is composed of alumina.

Figure 2F:
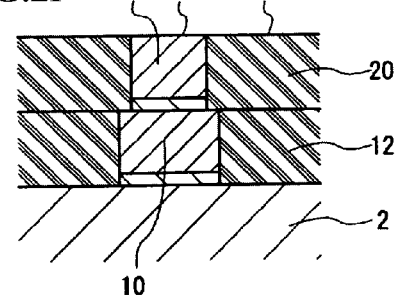

Next, as shown in FIG. 2F, a surface 20a of the second stage protective film 20 and end surfaces 18a of the second stage vertical leads 18 are ground flat so that the surface 20a and the end surfaces 18a become flush (a second stage grinding process).

A second stage protective film forming process that forms the second stage protective film 20 on the first stage protective film 12 so as to surround and protect outer circumferential surfaces of the second stage vertical leads 18 is composed of the second stage protective film covering process and the second stage grinding process.

Figure 2G:
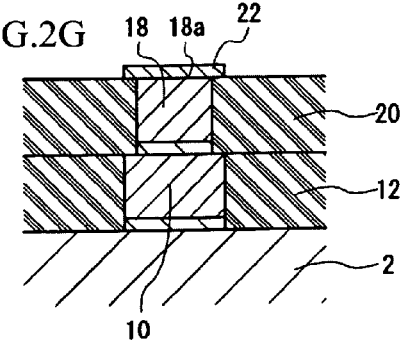

After this second stage protective film forming process, as shown in FIG. 2G, a process that forms pads 22 on the end surfaces 18a of the second stage vertical leads 18 is carried out.

In this way, with the method of forming vertical leads according to the present embodiment, vertical leads (a conductive pattern) composed of the first stage vertical leads 10 and the second stage vertical leads 18 are formed. The magnetic head on which the vertical leads have been formed by the method of forming vertical leads according to the present embodiment is mounted on a gimbal portion of a suspension and is electrically connected via the pads and the vertical leads 10 and 18 to wiring on the suspension by metal balls, solder, or the like.

With the method of forming vertical leads of a magnetic head according to the present embodiment, the formation of the vertical leads is divided in the height direction into a first stage and a second stage, and therefore the depths of the holes 8a and 16a formed in the resist layers 8 and 16 can be suppressed. Since plating is carried out into the holes 8a and 16a that are shallow during the electrolytic plating operations that form the first stage vertical leads 10 and the second stage vertical leads 18, the plating solution can spread out favorably, making it possible to form vertical leads with favorable electrical connectivity.

That is, with the method of forming vertical leads of a magnetic head according to the present embodiment, even when forming vertical leads that are around 30 to 40 µm wide and around 70 to 80 µm high, for example, by forming the vertical leads in two stages in the height direction, it is possible to avoid the problem of the plating solution not spreading into the holes in the resist layer that correspond to the vertical leads, and therefore the vertical leads can be formed favorably.

In particular, since the surface 12a of the first stage protective film 12 and the end surfaces 10a of the first stage vertical leads 10 are ground flat in the first stage grinding process, the second resist layer 16 can be formed with a highly precise position and form. In addition, since the second stage vertical leads 18 are formed narrower than the first stage vertical leads 10, even if the second stage vertical leads 18 are displaced with respect to the first stage vertical leads 10 due to an error during photolithography, it will still be possible to position the second stage vertical leads 18 completely on the end surfaces 10a of the first stage vertical leads 10 and therefore maintain favorable electrical connectivity. Also, since the resist layer is divided into the first and second resist layers that are both formed thinly, it is possible to form the resist patterns easily and with highly precise forms.

Since there are cases where vertical leads with even higher aspect ratios of the height to the width are formed, if forming the vertical leads in two stages would result in difficulty in forming the resist layers or in plating due to aspect ratio still being too high in the respective stages, the processes that form the second stage in the embodiment described above may be repeated to form the vertical leads in a larger number of stages.

A method where third stage vertical leads are also formed as a third stage conductive pattern after the second stage vertical leads 18 have been formed by carrying out the procedure of the above embodiment as far as the second stage protective film forming process (see FIG. 2F) will now be described.

This can be realized by carrying out the same processes as those used to form the second stage vertical leads 18 on a surface 20a of the second stage protective film 20 and the end surfaces 18a of the second stage vertical leads 18. That is, by carrying out processes that are the same as the second resist layer forming process, the second stage vertical lead forming process, the second resist layer removing process, and the second stage protective film forming process, it is possible to form third stage vertical leads 32 and a third stage protective film 26.

Figure 3A:
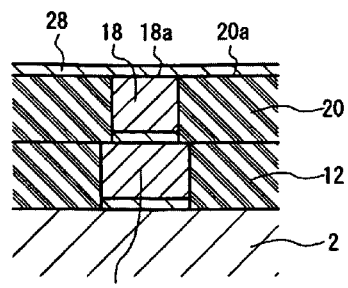
FIGS. 3A to 3G are diagrams useful in explaining a method of forming a conductive pattern in a larger number of stages (three stages) according to a method of forming a conductive pattern according to the present invention.

These processes will now be described with reference to FIGS. 3A to 3F. After the above procedure has been carried out as far as the second stage protective film forming process (see FIG. 2F), as shown in FIG. 3A, a third conductive layer 28 used as a base for electrolytic copper plating is formed by sputtering on the surface 20a of the second stage protective film 20 and the end surfaces 18a of the second stage vertical leads 18.

Figure 3D:
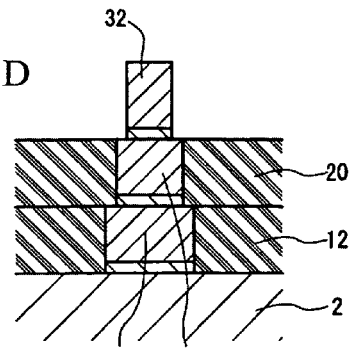
Figure 3B:
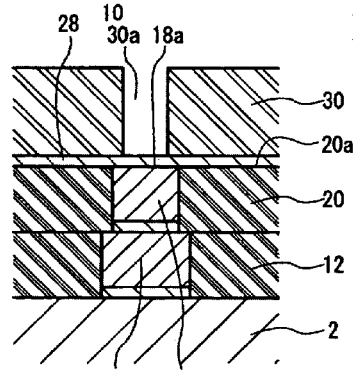

Next, as shown in FIG. 3B, by carrying out photolithography on the surface 20a of the second stage protective film 20 and the end surfaces 18a of the second stage vertical leads 18 (i.e., on the third conductive layer 28), a photosensitive third resist layer 30 is formed so that parts of the end surfaces 18a of the second stage vertical leads 18 are exposed (the end surfaces 18a are exposed via the third conductive layer 28) (a third resist layer forming process).

Note that the third resist layer 30 should be formed so that the exposed areas of the end surfaces 18a of the second stage vertical leads 18 exposed from the third resist layer 30 are around 10% smaller than the entire areas of the end surfaces 18a.

After this, electrolytic copper plating is carried out inside holes 30a corresponding to the vertical leads with the third conductive layer 28 as the power supplying layer. By doing so, as shown in FIG. 3C, the holes 30a are filled with copper by the electrolytic copper plating to form third stage vertical leads 32 on the end surfaces 18a of the second stage vertical leads 18 (a third stage vertical lead forming process).

Next, as shown in FIG. 3D, the third resist layer 30 is removed (a third resist layer removing process) and the third conductive layer 28 that becomes exposed by doing so is removed by a well-known method such as ion milling.

Figure 3E:
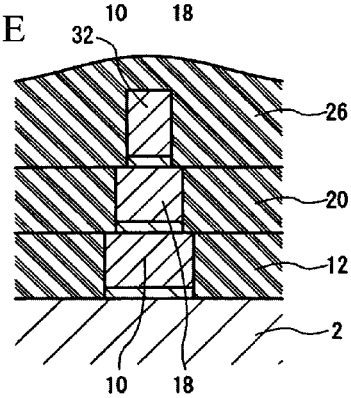
Figure 3C:
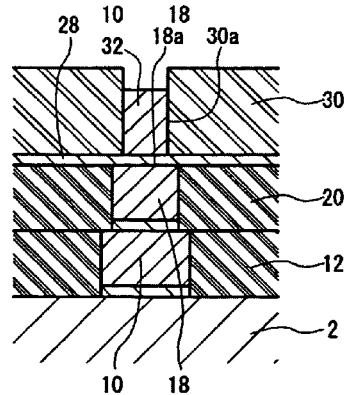

After this, as shown in FIG. 3E, a third stage protective film 26 is formed on the second stage protective film 20 to cover and protect the third stage vertical leads 32 (a third stage protective film covering process). Note that the third stage protective film 26 is composed of alumina.

Figure 3F:
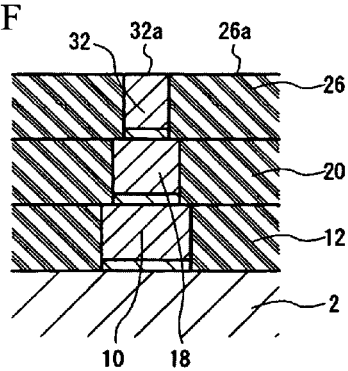

Next, as shown in FIG. 3F, a surface 26a of the third stage protective film 26 and end surfaces 32a of the third stage vertical leads 32 are ground flat so that the surface 26a and the end surfaces 32a become flush (a third stage grinding process).

Figure 3G:
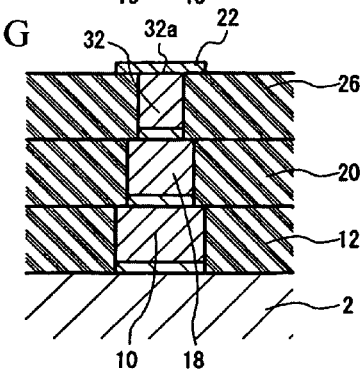

After this third stage protective film forming process, as shown in FIG. 3G, a process that forms pads 22 on the end surfaces 32a of the third stage vertical leads 32 is carried out.

Note that it should be obvious that the same processes are not limited to being carried out in two stages or three stages, and the vertical leads can be constructed in a larger number of stages.

What is claimed is:

1. A method of forming a conductive pattern of a magnetic head, comprising:
    a first resist layer forming process that forms a first resist layer, which exposes formation positions of the conductive pattern, on a formation surface on which the conductive pattern is to be formed;
    a first stage conductive pattern forming process that forms a first stage conductive pattern by carrying out plating at the positions of the formation surface that are exposed from the first resist layer;
    a first resist layer removing process that removes the first resist layer;
    a first stage protective film covering process that forms a first stage protective film, which covers and protects the first stage conductive pattern, on the formation surface;
    a first stage grinding process that grinds flat a surface of the first stage protective film and end surfaces of the first stage conductive pattern to make the surface and the end surfaces flush;
    a second resist layer forming process that forms a second resist layer, which exposes parts of the end surfaces of the first stage conductive pattern more narrowly than the first stage conductive pattern, on the surface of the first stage protective film and the end surfaces of the first stage conductive pattern;
    a second stage conductive pattern forming process that forms a second stage conductive pattern by carrying out plating at the positions on the end surfaces of the first stage conductive pattern that are exposed from the second resist layer;
    a second resist layer removing process that removes the second resist layer; and
    a second stage protective film forming process that forms a second stage protective film, which surrounds and protects outer circumferential surfaces of the second stage conductive pattern, on the first stage protective film.

2. A method of forming a conductive pattern of a magnetic head according to claim 1,
    wherein in the second resist layer forming process, the second resist layer is formed so that exposed areas of end surfaces of the first stage conductive pattern that are exposed from the second resist layer are around 10% smaller than entire areas of the end surfaces.

3. A method of forming a conductive pattern of a magnetic head according to claim 1, further comprising a process of forming pads on end surfaces of the second stage conductive pattern after the second stage protective film forming process.

4. A method of forming a conductive pattern of a magnetic head according to claim 1,
    wherein the second stage protective film forming process includes:
    a second protective film covering process that forms the second protective film on the first stage protective film to cover and protect the second stage conductive pattern; and
    a second stage grinding process that grinds flat a surface of the second stage protective film and end surfaces of the second stage conductive pattern to make the surface and the end surfaces flush,
    wherein after the second stage protective film forming process, a third stage conductive pattern and a third stage protective film are formed on the surface of the second stage protective film and the end surfaces of the second stage conductive pattern by carrying out identical processes to the second resist layer forming process, the second stage conductive pattern forming process, the second resist layer removing process, and the second protective film forming process.

5. A method of forming a conductive pattern of a magnetic head according to claim 1,
    wherein a process that forms a first conductive layer as a base for plating on the formation surface is carried out before the first resist layer forming process,
    a process that removes the first conductive layer is carried out after the first resist layer forming process, the first stage conductive pattern forming process, and the first resist layer removing process, a process that forms a second conductive layer as a base for plating on the surface of the first stage protective film and the end surfaces of the first stage conductive pattern is carried out after the first stage protective film covering process and the first stage grinding process, a process that removes the second conductive layer is carried out after the second resist layer forming process, the second stage conductive pattern forming process, and the second resist layer removing process, and the plating that forms the first stage and the second stage conductive patterns is electrolytic plating that respectively uses the first conductive layer and the second conductive layer as power supplying layers.

6. A method of forming a conductive pattern of a magnetic head according to claim 1, wherein the first and second resist layer forming processes respectively form the first and second resist layers by photolithography.

7. A method of forming a conductive pattern of a magnetic head according to claim 1, wherein the first and second protective films are composed of alumina.

* * * * *